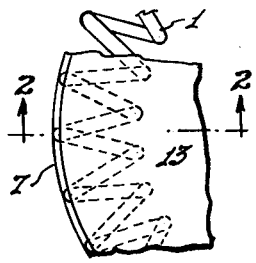
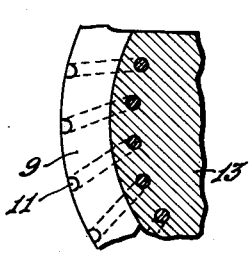
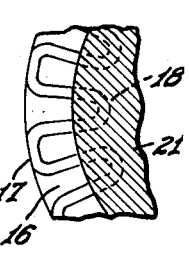
FIG. 1.  FIG. 4.  FIG. 5.  FIG. 8.
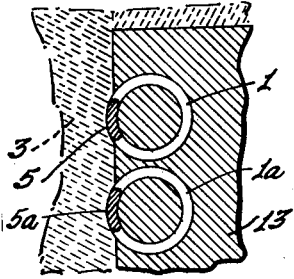
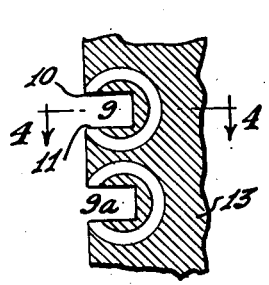
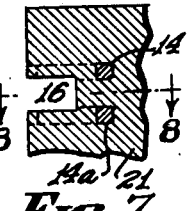
FIG. 2.  FIG. 3.  FIG. 6.  FIG. 7.
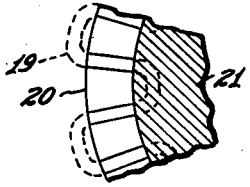
FIG. 9.
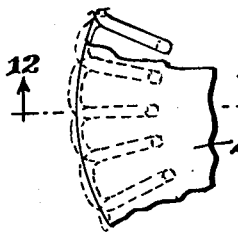
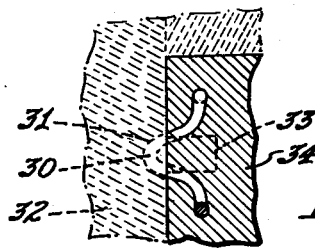
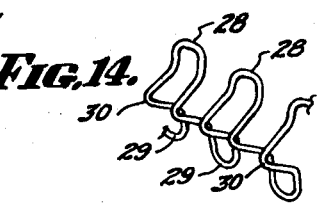
FIG. 11.  FIG. 13.  FIG. 14.
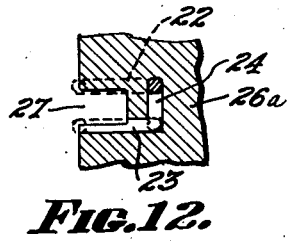
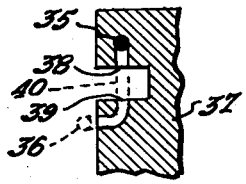
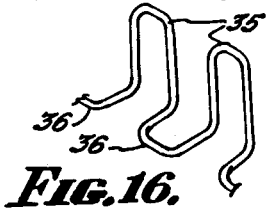
FIG. 12.  FIG. 15.  FIG. 16.
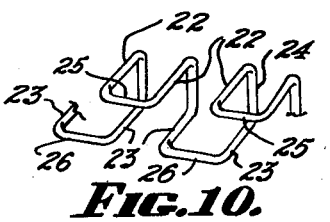
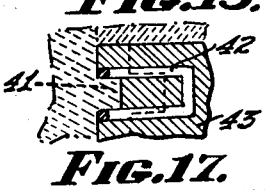
FIG. 10.  FIG. 17.
INVENTORS.
MARSHALL G. WHITFIELD
AND WENDELL C. CHENEY.
BY Allen & Allen
ATTORNEYS.

United States Patent Office 2,793,923
Patented May 28, 1957

2,793,923

REINFORCED LIGHT METAL PISTON

Marshall G. Whitfield, Garden City, N. Y., and Wendell C. Cheney, Lake City, Minn.

Application January 26, 1955, Serial No. 484,127

11 Claims. (Cl. 309—14)

The invention pertains to the reinforcement of light metal pistons particularly at the places where piston-ring-receiving grooves are machined or milled, therein. It has hitherto been proposed to embody ferrous metal reinforcements in light metal pistons at such positions in order better to sustain wear. In one procedure an iron annulus is incorporated in the piston during the casting thereof and the piston ring groove or grooves are cut in the reinforcement. This is not only expensive but frequently involves exaggerated problems of bonding.

In a copending application Serial No. 353,501, filed May 7, 1953, and entitled Light Metal Piston With Reinforcement, and the Like, Marshall G. Whitfield, one of the inventors herein, has taught the use of embedded reinforcing elements most conveniently made from wire or ferrous strand materials. The reinforcements are sinuous in the direction of their length, which is the circumferential direction of the piston, and are located so as to extend on either side of the position of the piston ring groove or grooves. The reinforcing elements are embedded and are cut by the grooves in such fashion as to be exposed within the grooves to resist wear at the upper and lower groove faces.

It is an object of the present invention to provide improved forms of strand reinforcement.

It is an object of the invention to provide reinforcing elements which may be located in the molds during casting in a simpler, less expensive and more positive fashion.

It is an object of the invention to provide types of reinforcement having superior anchorage in the body of the light metal piston.

It is an object of the invention in some embodiments to provide types of reinforcements which are more effective as respects the points at which maximum groove wear occurs.

These and other objects of the invention which will be set forth hereinafter or will be apparent to one skilled in the art upon reading these specifications are accomplished in those structures and by following that procedure of which certain exemplary embodiments will hereinafter be described. Reference is made to the accompanying drawings wherein:

Figure 1 is a partial plan view of one form of reinforced piston.

Figure 2 is a partial sectional view taken along the line 2—2 of Figure 1, showing also certain mold parts in dotted line section.

Figure 3 is a similar partial sectional view of the piston after it has been dressed and after the piston ring grooves have been cut in it.

Figure 4 is a partial horizontal section taken along the line 4—4 of Figure 3.

Figure 5 is a partial plan view of a piston showing another form of reinforcement.

Figure 6 is a partial sectional view taken along the line 6—6 of Figure 5.

Figure 7 is a partial sectional view of the same piston in dressed condition after a groove has been cut in it.

Figure 8 is a partial horizontal section of the same piston taken along the line 8—8 of Figure 7.

Figure 9 is a partial sectional view of a piston with a somewhat modified reinforcement.

Figure 10 is a partial perspective view of a wire reinforcing element of yet another type.

Figure 11 is a partial plan view of a piston embodying the reinforcement of Figure 10.

Figure 12 is a partial sectional view thereof taken along the line 12—12 of Figure 11 after the piston has been dressed and a groove cut therein.

Figure 13 is a partial sectional view of a piston embodying yet another type of wire reinforcement, portions of the mold parts in which the piston is cast being shown in section in dotted lines.

Figure 14 is a perspective view of a portion of the wire reinforcing element used in the structure of Figure 13.

Figure 15 is a partial sectional view of a dressed and grooved piston embodying yet another type of reinforcement.

Figure 16 illustrates in perspective a portion of the reinforcing element used in the structure of Figure 15.

Figure 17 is a partial sectional view of a piston incorporating a wire reinforcement, showing certain mold parts in dotted line section, and illustrating another mode of supporting the reinforcement in the mold.

Briefly, in the practice of the invention, reinforcing elements made of heavy metal, wire or strand (usually iron or steel wire) are formed with sinuous convolutions of various shapes, and then are located in a mold so that the sinuosity is circumferential in part at least. As will hereinafter be more fully explained the reinforcement is of such character that it can be supported in a mold, substantially convolution-by-convolution, either by the entry of some portion of the convolutions into a groove in the mold walls or by the engagement of some portion of the convolutions with a land on the mold walls. This does not significantly complicate the mold structure; but it makes for a positive supporting of the reinforcing structure at the place where a piston ring groove or grooves is to be cut. The reinforcement itself may be formed as a sinuous body of indefinite length, may be cut into lengths suitable for the formation of pistons of differing sizes, and these lengths may be readily curved to fit the inside cylindrical walls of a mold. The reinforcements maintain their positions readily because of their tendency to straighten out from the curvature which has been imparted to them, and by reason of their engagement in the mold groove or with the land as aforesaid. A single length of reinforcing structure may thus serve the entire circumferential requirements of a given piston. Moreover, the reinforcement will be properly positioned to be cut when the piston ring groove is formed. Also, in some embodiments it becomes possible to provide reinforcements which extend for a considerable distance radially or throughout the entire radial extent of the upper and lower faces of the piston ring groove or grooves, as will hereinafter be set forth.

In a simple but effective embodiment of the invention the wire reinforcement is made in the form of a simple spring with slightly separated convolutions as shown at 1 in Figures 1 to 4 inclusive. Such a spring, usually of steel wire, may be cut to a desired length, curved and placed against the cylindrical side wall elements 3 of a piston ring mold in such fashion that a small lateral portion of each convolution of the spring will engage in a shallow groove 5 in the mold wall. This will serve to maintain the spring-like reinforcement in position accurately in the mold during the casting of the light metal body. Additional reinforcing structures of similar character may be used as at 1a in Figure 2.

The casting of light metal into the mold will result in the formation on the piston of an annular land 7 (Figure 1) at the position where the ring groove or grooves are to be cut. The diameter of the convolutions of the reinforcement is such as to be larger than the effective greatest dimension of a piston ring groove 9 or 9a milled or turned into the piston and cutting through the reinforcement from one side. This is most clearly shown in Figure 3. When the piston is dressed and the groove cut as aforesaid, the reinforcing element is severed into separate pieces of C-shape for each convolution, but end portions of each piece are exposed as at 10 and 11 at the outer edges of the upper and lower faces of the ring grooves. These positions are advantageous for resisting wear. Elsewhere the C-shape pieces are wholly embedded in the light metal body 13 of the piston. The discontinuous character of the reinforcement in its final form is advantageous in that it obviates difficulty arising from differences in the coefficients of expansion of the light and heavy metal constructions. The spacing of the convolutions of the spring-like reinforcement of Figures 1 to 4 is not critical; but the convolutions should be spaced far enough apart to permit ready flow of the light metal between them during the casting operation.

Another form of reinforcement is illustrated at 14 in Figures 5 to 8 inclusive. This form of reinforcement may be described as a flat serpentine of wire or strand. Since it is flat, it is adapted to reinforce only the upper or lower face of a piston ring groove, so that in the practice of the invention a pair of the reinforcing elements are employed in spaced position as at 14 and 14a in Figures 6 and 7. The reinforcing elements may be located as before with the outer ends of their convolutions engaged in shallow grooves in the cylindrical mold walls. Because of these grooves slight lands are formed on the cast metal piston as shown at 15 in Figure 5, which lands will be removed when the piston is dressed. Since the width of the serpentine convolutions of the reinforcement is greater than the depth of the ring groove 16 which will subsequently be formed, the convolutions act to reinforce the upper and lower interior surfaces of the grooves throughout their radial extent. Also the mold grooves may be of less depth than the diameter of the wire of the reinforcement so that the outer edges of the groove walls will be reinforced throughout the greater portion of their circumferential extent as shown at 17 in Figure 8. At the same time there are loop-like portions 18 of the convolutions which are wholly embedded in the body of the piston and provide good anchorage.

If desired, the outer bights 19 of the convolutions may be caused to extend so far beyond the dressed surface 20 of the piston that these bights will be cut away when the piston is dressed as shown in Figure 9. The piston body is marked 21 in Figures 5 to 9 inclusive.

The invention contemplates the advantageous use of somewhat more complicated shapes of wire reinforcement. These shapes may be inexpensively and conveniently formed by first making a serpentine configuration of wire or strand and then bending the convolutions laterally. Figure 10 shows a structure so made. The result of the lateral bending aforesaid is to provide a reinforcement having upper horizontally extending elements 22 and lower horizontally extending elements 23, an upper and lower element being connected at the rear by a vertically extending portion 24, and pairs of adjacent horizontally extending portions being connected at the front by other horizontally extending portions 25 or 26.

It will be evident that when the structure of Figure 10 is embedded by casting in the body 26a of a light metal piston as in Figures 11 and 12, the upper and lower horizontal portions 22 and 23 are adapted to reinforce both side faces of a piston ring groove 27, obviating the use of two separate reinforcements for each groove as in Figures 5 to 9. The front bights 25 and 26 of the structure of Figure 10 are engaged in shallow grooves in the cylindrical mold walls as has previously been explained, the rear bights 24 being wholly embedded in the piston body.

Another form of reinforcement is illustrated in Figure 14. It has been formed from a serpentine of wire or strand, which serpentine was subsequently deformed (as may readily be done between dies) to provide a structure characterized by upwardly extending bights 28, downwardly extending bights 29 and forwardly extending bights 30. As illustrated in Figure 13 such a reinforcement may be located in a mold with the forwardly extending bights 30 engaging in a shallow groove 31 in the cylindrical inner walls of the mold elements 32. The bights 30 will be removed when the cast piston is dressed; and when a piston ring groove 33 is cut in the piston 34 of Figure 13 reinforcement will be obtained not only at the outer edges of the upper and lower faces of the grooves but also for a considerable extent radially inwardly of these outer edges. The structure of Figure 14 may be bent or deformed in various ways to provide varying extents of exposed radial reinforcement. The upper and lower bights of the reinforcement may be of different lengths and differing shapes, as may be found desirable when a plurality of piston ring grooves are to be formed and strengthening of the intermediate lands is wanted.

A somewhat simpler structure is shown in Figures 15 and 16. From the latter figure it will be clear that a reinforcement has been produced by bending a serpentine of wire or strand laterally at a right angle so as to provide upwardly extending bights 35 and forwardly extending bights 36. When such reinforcement is used in a piston, as will be evident from Figure 15, the forwardly extending bights 36 may engage in a mold groove so as to locate the reinforcement. The upwardly extending bights 35 lie wholly embedded in the piston body 37. Reinforcement will be provided as at 38 and 39 in the upper and lower faces of the groove 40 when it is cut into the piston.

The location of the reinforcing elements in a mold and the maintenance of their position during the casting operation may in some instances be facilitated by the formation of lands in the circumferential mold walls as for example the land 41 in Figure 17. This is shown in use with a reinforcing element 42 similar to that shown in Figure 10. The land 41 will not only serve to maintain the position of the reinforcement during the casting of the light metal body 43 but will also somewhat diminish the cost of cutting the piston ring groove therein. Combinations of lands and grooves may be employed if desired.

In these specifications the term "light metal" is used to include aluminum, magnesium and their various alloys, and the term "heavy metal" has been used to include any metal of high strength (usually though not necessarily iron or steel) suitable for the provision of wear-resisting reinforcements. With reinforcements of the type herein taught, the matter of bond between the reinforcement and the light metal cast around it becomes of relatively less importance. Various expedients may be adopted to secure bond. Thus the wire or strand used to form the reinforcement may be a material which has previously been coated with the light metal by hot dipping. Even better bonds can, in many instances be secured by first coating the strand with a thin layer of a metal such as tin, zinc or nickel. Such metals are conveniently applied by electroplating, although in the case of zinc hot dipping may be practiced. In casting the light metal against the reinforcement the teachings set forth in a copending application of Marshall G. Whitfield Serial No. 309,773, filed September 16, 1952, and entitled Casting Light Metal Against Iron, and Article Formed Thereby, may be practiced. The use of a casting procedure in which the molten light metal is caused to flow against the surfaces of the reinforcement for a substantial length of time is of advantage in eliminating the effect of oxides on the surfaces of the strand or light metal; and where the light metal is an alloy of aluminum high in elements such as silicon (such for example as "vanasil") the temperature conditions may be so arranged that the reinforcement has a chilling effect on immediately adjacent portions of the molten metal resulting in a precipitation of some of the silicon or other alloying ingredient in a finely divided form, with consequent improvement of the bond.

Modifications may be made in the invention without departing from the spirit of it. The invention having been described in certain exemplary embodiments, what is claimed as new and desired to be secured by Letters Patent is:

1. A light metal piston having a heavy metal reinforcement, said reinforcement consisting of a convoluted wire extending in the direction of the circumference of said piston, the convolutions of said wire being characterized by spaced apart bight-like portions projecting outwardly therefrom, said reinforcement being embedded in said piston excepting for said bight-like portions which, in the as-cast condition of said piston, project outwardly beyond the cylindrical wall surface thereof.

2. The structure claimed in claim 1 wherein the said bight-like portions of the said convolutions are so shaped as to be capable of extending into a groove in the walls of the mold in which said piston is cast.

3. The structure claimed in claim 1 wherein the said bight-like portions of the said convolutions are located with respect to the body of said piston at the position of a piston ring groove to be formed therein, whereby as a consequence of the formation of said groove said bight-like portions will be cut away.

4. The structure claimed in claim 1 in which the said convoluted reinforcement is in the form of a helical spring.

5. The structure claimed in claim 1 wherein said reinforcement is in the form of a flat serpentine with outwardly and inwardly extending bights.

6. The structure claimed in claim 1 wherein said reinforcement is in the form of a flat serpentine with outwardly and inwardly extending bights, and in which a pair of such serpentines is employed for each piston ring groove so as to reinforce upper and lower faces thereof.

7. A piston or like light metal article having therein a strand reinforcing wire-like element of heavy metal, said wire-like element being sinuous in the direction of its length and provided with outwardly extending bights on each convolution, which bights are adapted to be engaged in a groove in the circumferential walls of a mold in which said light metal is cast about said reinforcement.

8. A piston or like light metal article having therein a heavy metal reinforcement formed of heavy metal wire-like strand configured to be sinuous in the direction of its length, the sinuosities being deformed laterally so as to present outwardly extending bights adapted to be engaged against the circumferential walls of a mold in which said light metal is cast about said reinforcement.

9. A piston or like light metal article having therein a heavy metal reinforcement comprising a heavy metal wire-like strand which is sinuous in the direction of its length, the convolutions thereof being bent laterally so as to provide upwardly and downwardly extending bights and intermediate forwardly extending bights by means of which said reinforcement may be located in a mold.

10. A piston or like light metal article having therein a heavy metal reinforcement, said reinforcement comprising a heavy metal wire-like strand which is sinuous in the direction of its length, the said structure being deformed laterally so as to present a U-shape in cross section with upper and lower alternately spaced outwardly projecting bights.

11. A piston or like light metal article having therein a heavy metal reinforcement comprising a heavy metal wire-like strand which is sinuous in the direction of its length and so configured as to present upper and lower horizontal forwardly extending bights and vertical rearwardly extending bights.

References Cited in the file of this patent

UNITED STATES PATENTS

| | | |
|---|---|---|
| 2,685,729 | Daub | Aug. 10, 1954 |

FOREIGN PATENTS

| | | |
|---|---|---|
| 540,990 | Great Britain | Nov. 7, 1941 |
| 548,400 | Great Britain | Oct. 8, 1942 |
| 897,373 | France | Mar. 20, 1945 |